United States Patent [19]

Wuertz

[11] Patent Number: 4,902,852
[45] Date of Patent: Feb. 20, 1990

[54] POWER POLE WIRING CHAMBER

[75] Inventor: Emil S. Wuertz, Madison, Conn.

[73] Assignee: Hubbell Incorporated, Orange, Conn.

[21] Appl. No.: 311,346

[22] Filed: Feb. 15, 1989

[51] Int. Cl.$^4$ .............................................. H02G 3/04
[52] U.S. Cl. ...................................... 174/48; 174/101
[58] Field of Search ................ 174/48, 49, 68, 3, 101; 52/220, 221; 362/431

[56] References Cited

U.S. PATENT DOCUMENTS

| | | | |
|---|---|---|---|
| 4,092,486 | 5/1978 | Myers | 174/48 |
| 4,178,468 | 12/1979 | Jorgensen et al. | 174/48 |
| 4,284,840 | 8/1981 | Baker | 174/48 |
| 4,373,111 | 2/1983 | Myers et al. | 174/48 |
| 4,577,055 | 3/1986 | Wuertz | 174/48 |

Primary Examiner—Leo P. Picard
Assistant Examiner—David A. Tone
Attorney, Agent, or Firm—Jerry M. Presson; Walter C. Farley

[57] ABSTRACT

A power pole is constructed so that a U-shaped body portion forming a power conductor channel extends beyond a similarly shaped portion forming a communications conductor channel by a predetermined distance. A cover plate and a top plate are provided to close this extending portion to form a wiring chamber. The cover plate is provided with edges which interlock with the edges of the power channel structure, the edges being crimped to form a permanent assembly. The top plate is removable to provide access to the interior of the chamber.

6 Claims, 3 Drawing Sheets

POWER POLE WIRING CHAMBER

This invention relates to an improved power pole structure, and more specifically, to a structure for the top of a power pole which forms a wiring chamber.

BACKGROUND OF THE INVENTION

Power poles, also called service poles or duct posts, are used to bring power or communication lines (or both) from a source location above a false ceiling to a level at which the power or communication outlets are needed, usually near a floor or adjacent a desk. Generally, a power pole is a hollow rectangular tube which is divided internally by a longitudinal wall to isolate the power and communication lines from each other. Power outlets and communication connectors or knockouts are provided for access to the lines.

At the upper end of such a power pole, it is necessary to provide some arrangement for connecting the wires within the pole to the service wires in the ceiling which may be available at junction boxes attached to the building structure or in some other form. Occasionally, the wiring is part of an overall "system" with special plugs, etc. so that the top of the pole requires a mating connector. More often, however, installation is a matter of an electrician connecting wires to each other using solderless connectors, i.e, WIRE-NUTS, or the like. For that purpose, the top of the pole must have some arrangement for enclosing the connections after they have been made in order to satisfy code requirements. Various forms of junction box devices have been proposed but all involve rather complex structures which are expensive to manufacture and time consuming to use.

SUMMARY OF THE INVENTION

Accordingly, an object of the present invention is to provide a wiring chamber for the top of a power pole, the chamber having a minimum number of parts and being inexpensive to produce and simple to use.

A further object is to provide such a chamber a major part of which is formed as part of the power pole itself and therefore requires no separate manufacture or assembly steps.

Briefly described, the invention includes an improved power pole structure comprising a first elongated U-shaped metal body having an open side and open upper and lower ends, and a second elongated U-shaped metal body also having an open side and upper and lower ends, the open side of the second body being coupled to the open side of the first body to form a housing, the upper end of the second body terminating a predetermined distance from the upper end of the first body, thereby leaving a portion of the open side of the first body uncovered. An elongated wall is attached to one of the first and second bodies along one of those open sides to separate the housing into a power wire chamber and a communication wire chamber, the elongated wall also terminating the predetermined distance from the upper end of the first body, leaving that portion of the open side uncovered. The edges of the uncovered portion of the first body are bent to form a reverse curve, and a cover plate dimensioned and shaped to close the uncovered portion of the first body is provided with hook-shaped edges shaped to engage the reverse curves, the edges of the cover plate and the first body being crimped together to maintain the cover plate in position, the cover plate also having a latch opening adjacent an upper edge thereof. A top plate is dimensioned to close the upper end of the first body, the top plate having means to engage the latch opening, thereby forming a wiring chamber at the upper end of the pole.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein.

DESCRIPTION OF THE PREFERRED EMBODIMENT

Figure 1:
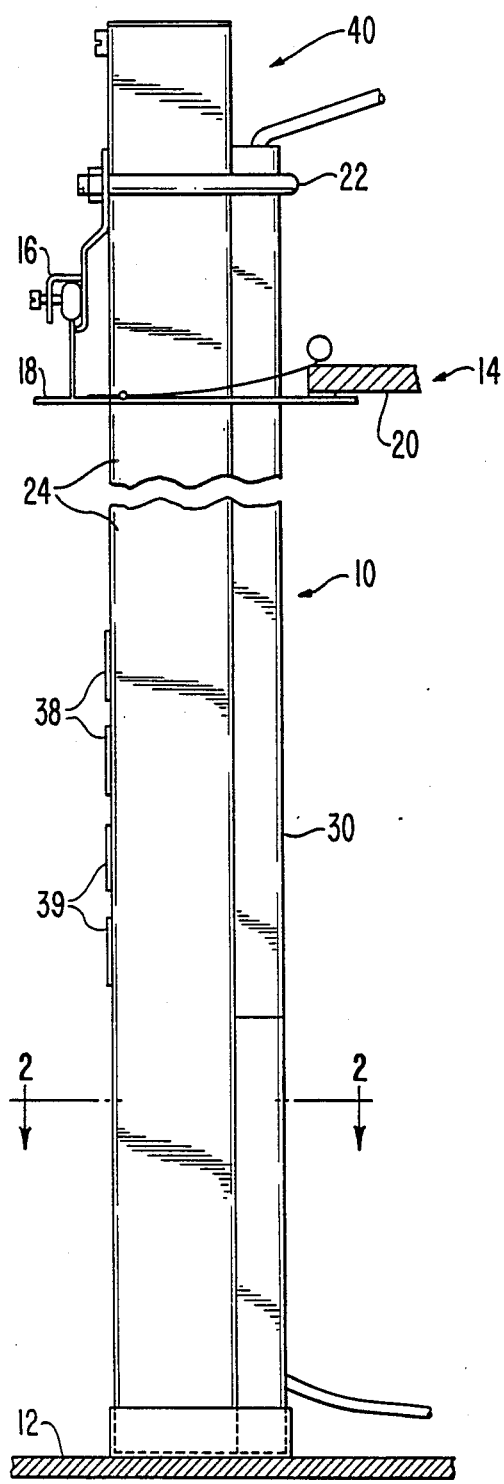
FIG. 1 is a foreshortened side elevation of a power pole in accordance with the present invention in a typical installation.
Figure 7:
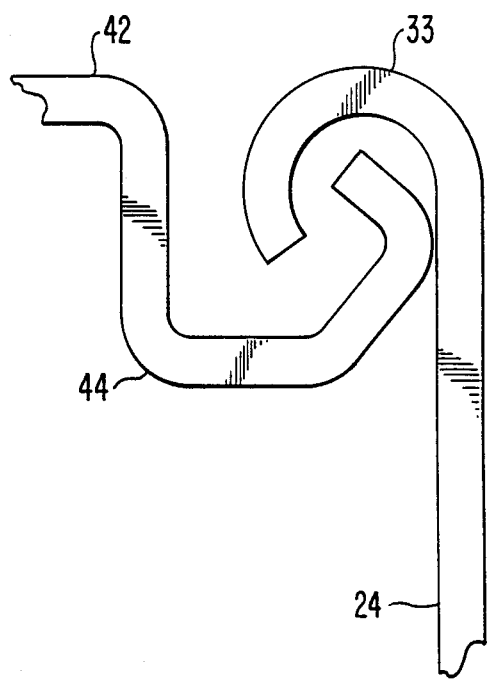
FIG. 7 is a fragmentary top plan view of the reverse curved and hook-shaped edges of the power pole body and cover plate before crimping.

FIG. 1 shows a power pole indicated generally at 10 in a typical installation with the bottom of the pole resting on a floor 12 and extending through a false ceiling 14 so that the upper end of the pole is not normally visible and can be connected to wiring as necessary. The pole is provided with a pole clamp 16 which is connected to part of a T-bar assembly 18 of a conventional type which is used to support ceiling tiles 20 or the like forming the false ceiling. The pole clamp is attached to a U-shaped clamp rod 22 which maintains the upper end of the power pole in position.

Figure 2:
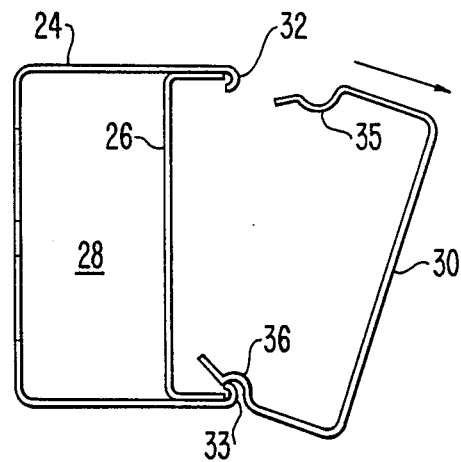
FIG. 2 is a transverse sectional view along line 2—2 of FIG. 1.

The power pole itself is formed with a first body portion 24 which, as seen in the sectional view of FIG. 2, is an elongated channel body which is generally U-shaped, the first body having an open side. A dividing wall 26 is fastened inside of the first body, thereby forming a channel or chamber 28 through which power conductors can extend. A second elongated U-shaped body 30 is attached to the open side of body 24 to form a second chamber for receiving communication cables or the like. In order to attach the two bodies together, the longitudinal edges of body 24 are bent to form reverse curves 32 and 33. The mating edges of body 30 are formed with longitudinal indentations 35 and 36 to engage the reverse curves, the sheet metal material of body 30 having sufficient flexibility to allow the bodies to be snapped together or apart with a simple pulling or pushing motion.

As seen in FIG. 1, body 30 can be made in more than one section so that portions thereof can be individually removed. Normally, at least part of body 30 is provided with telephone access knockouts or the like to provide access to the communication conductors. Body 24 can be provided with duplex receptacles 38 and 39 for access to the power supplied by the cables extending through the power chamber.

Figure 3:
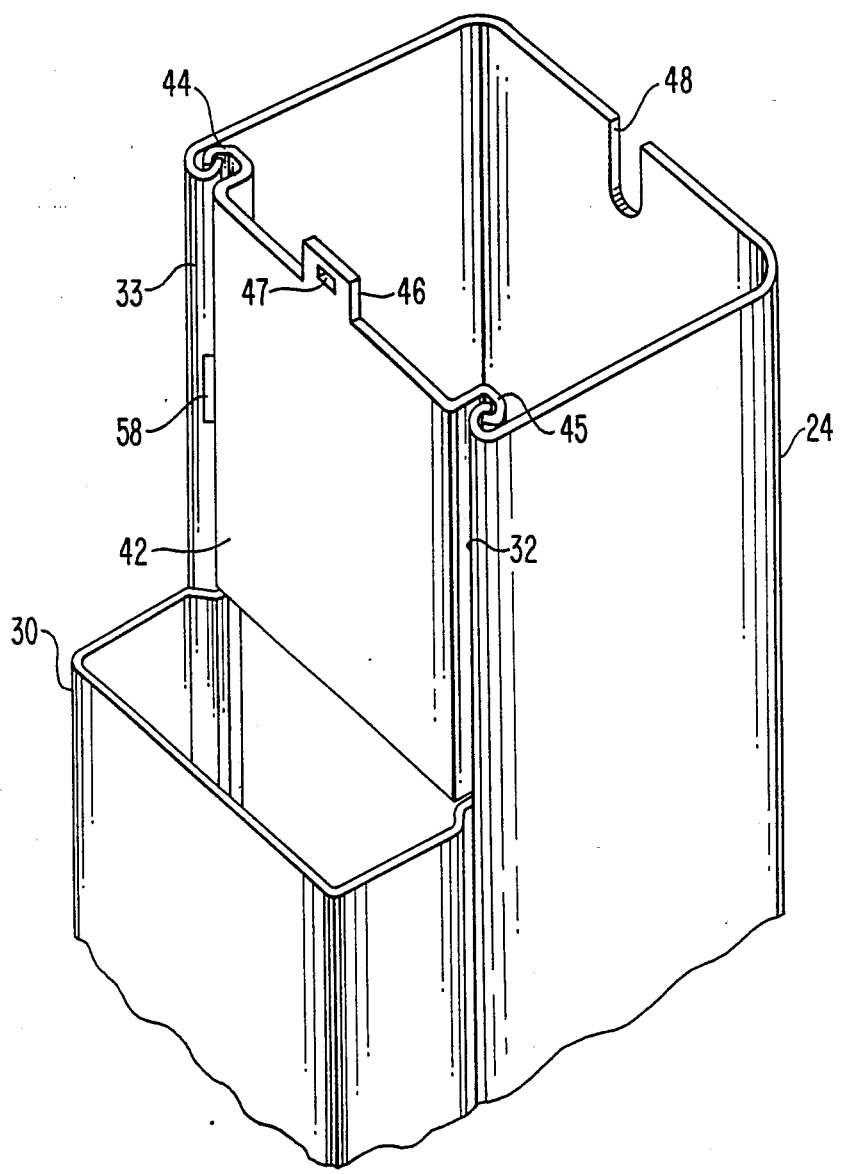
FIG. 3 is a fragmentary perspective view of the top portion of the pole of FIG. 1 with the mounting apparatus and top plate removed.
Figure 4:
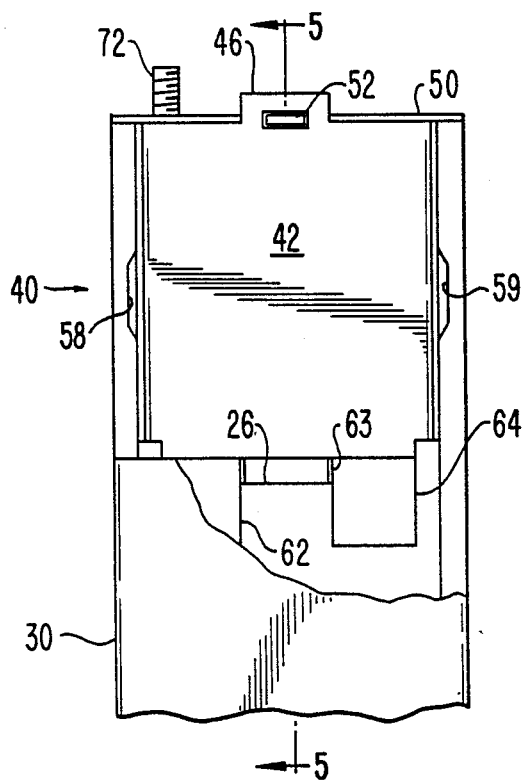
FIG. 4 is a front elevation, partially cut away, of the top portion of the power pole of FIG. 1.
Figure 5:
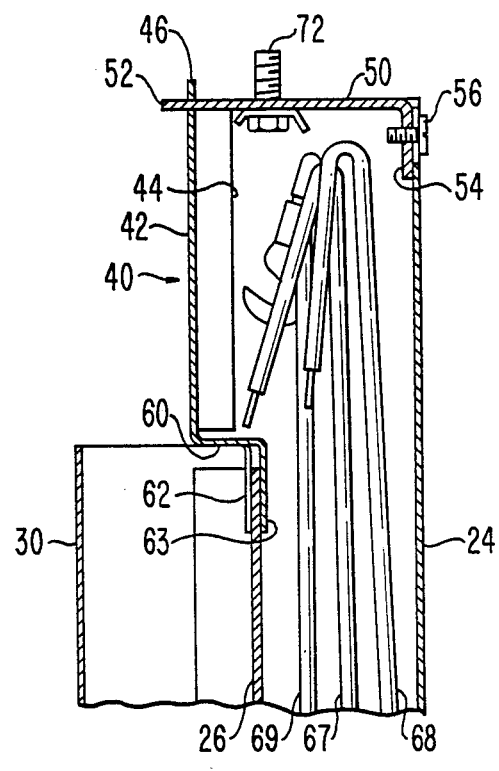
FIG. 5 is a side elevation, in section, along line 5—5 of FIG. 4.

At the upper end of the power pole, which is the region of particular interest to the present invention, body 30 terminates somewhat below the upper end of body 24, leaving a portion 40 which is separately illustrated in FIGS. 3, 4 and 5. A cover plate 42 is provided to close the uncovered portion at the top of body 24 which is left exposed by the relative shortness of body 30. Cover plate 42 has edges 44 and 45 which are bent to form hooks which can engage the reverse curves formed at the edges of body 24. Plate 42 also has a protruding tab 46 on the upper edge thereof, the tab having a rectangular hole 47 therethrough.

At the upper edge of the wall of body 24 opposite plate 42 is a recess 48 which extends downwardly from the upper edge of body 24 to receive a locking screw.

Figure 8:
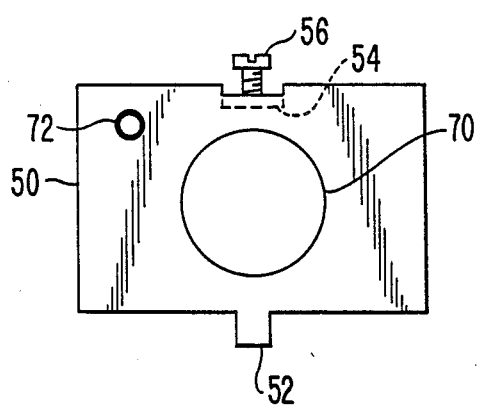
FIG. 8 is a top plan view of the top plate employed in the power pole of FIGS. 4 and 5.

Recess 48 and tab 46 are provided to engage a top plate 50, separately shown in FIG. 8, which has a tongue 52 dimensioned to pass through hole 47. At the opposite edge of plate 50 is a downwardly bent tongue 54 having an internally threaded hole to receive a locking screw 56, the threaded body thereof being sufficiently small to enter recess 48. Thus, to place the top plate in the position shown in FIG. 5, tongue 52 is inserted through opening 47, and screw 56 is allowed to drop into recess 48, after which the screw is tightened to lock the plate in position.

During initial manufacture, the interlocking edges 44,33 and 45,32 of plate 42 and body 24 are crimped together as shown at locations 58 and 59 in FIG. 4 so that plate 42 becomes essentially a permanent part of body 24, closing the relatively short section at the top of the body to form a wiring chamber which is subsequently accessible by removal of top plate 50.

Figure 6:
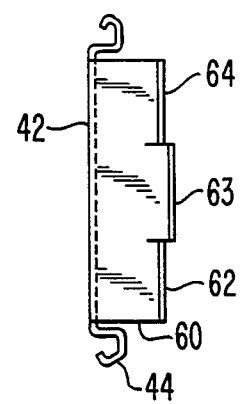
FIG. 6 is a bottom plan view of the cover plate employed in the power pole of FIGS. 3, 4, and 5.

At the lower edge of the cover plate, the plate is coupled to the dividing wall 26. As best seen in FIGS. 5 and 6, the lower edge of plate 42 has a rearwardly bent portion 60 which is separated into three fingers 62, 63 and 64, finger, 63 being laterally offset from the other two fingers by a distance sufficient to receive the thickness of dividing wall 26 therebetween. This completes the formation of a wall between the wiring chamber and the communication chamber, or the surrounding air, so that the wiring chamber is essentially closed except for the passage constituting the interior of body 24 for the wires to extend into this wiring chamber. Typical electrical wires 67, 68 and ground wire 69 are normally furnished within the pole as part of the product so that wiring connections can be made at the installation location simply by removing top plate 50, extracting the ends of the wires, making the connections, and then returning the junctions to the interior of the chamber. A knockout or opening 70 is provided in top plate 50 for this purpose and a grounding screw 72 is furnished in a threaded hole through top plate 50 so that a proper ground connection can be made.

As will be recognized, by forming bodies 24 and 30 so that a portion of body 24 of predetermined length protrudes beyond body 30, and by then providing simple plates 42 and 50 with the edge interconnections for plate 42, a wiring chamber is formed at the upper end of the power pole without the necessity for manufacturing a separate junction box and then attaching it in some fashion to the power pole itself. The chamber thus formed is fully adequate to receive the connections normally made and is closable in such a way that code requirements are fully met.

While one advantageous embodiment has been chosen to illustrate the invention, it will be understood by those skilled in the art that various changes and modifications can be made therein without departing from the scope of the invention as defined in the appended claims.

What is claimed is:

1. An improved power pole structure comprising
   a first elongated U-shaped metal body having an open side and open upper and lower ends;
   a second elongated U-shaped metal body having an open side and upper and lower ends, said open side of said second body being coupled to said open side of said first body to form a housing, said upper end of said second body terminating a predetermined distance from said upper end of said first body, thereby leaving a portion of the open side of said first body uncovered;
   an elongated dividing wall attached to one of said first and second bodies along one of said open sides to separate said housing into a power wire chamber and a communication wire chamber, said elongated dividing wall terminating said predetermined distance from the upper end of said first body leaving said portion of said open side uncovered;
   the edges of at least said uncovered portion of said first body being bent to form a reverse curve; a cover plate dimensioned and shaped to close said uncovered portion of said first body, said cover plate having hook-shaped edges shaped to engage said reverse curves, said edges of said cover plate and said first body being crimped together to maintain said cover plate in position, said cover plate having a latch opening adjacent an upper edge thereof; and
   a top plate dimensioned to close the upper end of said first body, said top plate having means to engage said latch opening, thereby forming a wiring chamber at said upper end of said pole.

2. A power pole according to claim 1 wherein the entire edges of said first body are bent to form a reverse curve.

3. A power pole according to claim 1 wherein said cover plate includes a tab protruding from the upper edge thereof, said tab having said latch opening therein.

4. A power pole according to claim 3 wherein said cover plate further comprises
   means defining a plurality of fingers extending downwardly at the bottom of said plate, said fingers being alternatingly laterally offset and engaging opposite sides of said dividing wall.

5. A power pole according to claim 4 and further comprising
   a locking screw on said top plate, and
   means defining a recess at the upper end of said first body to receive said locking screw when said top plate is closing said upper end.

6. A power pole according to claim 1 wherein said cover plate further comprises
   means defining a plurality of fingers extending downwardly at the bottom of said plate, said fingers being alternatingly laterally offset and engaging opposite sides of said dividing wall.

* * * * *